United States Patent [19]
Heck et al.

[11] Patent Number: 5,891,502
[45] Date of Patent: Apr. 6, 1999

[54] PROCESS FOR THE PREPARATION OF A FOODSTUFF BY EXTRUSION

[75] Inventors: Ernst Heck, Vufflens-La-Ville; Osvaldo Geromini; Werner Pfaller, both of Orbe, all of Switzerland

[73] Assignee: Nestec S.A., Vevey, Switzerland

[21] Appl. No.: 883,763

[22] Filed: Jun. 27, 1997

[30] Foreign Application Priority Data

Jun. 30, 1996 [EP] European Pat. Off. ............... 96201958

[51] Int. Cl.⁶ ..................................................... A23P 1/00
[52] U.S. Cl. ............................................ 426/516; 426/448
[58] Field of Search ..................................... 426/516, 448, 426/449, 523; 425/204

[56] References Cited

U.S. PATENT DOCUMENTS

| | | | |
|---|---|---|---|
| 4,590,081 | 5/1986 | Sawada et al. | 426/448 |
| 5,273,419 | 12/1993 | Mayer | 425/204 |
| 5,667,833 | 9/1997 | Juengling et al. | 426/516 |

FOREIGN PATENT DOCUMENTS

| | | |
|---|---|---|
| 41 28 630 | 7/1992 | Germany. |
| 95 23522 | 9/1995 | WIPO. |

*Primary Examiner*—George Yeung
*Attorney, Agent, or Firm*—Pennie & Edmonds LLP

[57] ABSTRACT

Process for preparing a foodstuff by extrusion, in which a first food substance to be processed is introduced into a first section of a twin-screw extruder, a second food substance to be processed is introduced into a second section of the twin-screw extruder, this section being separated dynamically from the first, these substances are each processed independently in their own section of the extruder, the two masses obtained are extruded, passing them through at least one die, and the extruded product or products is or are cut.

20 Claims, 3 Drawing Sheets

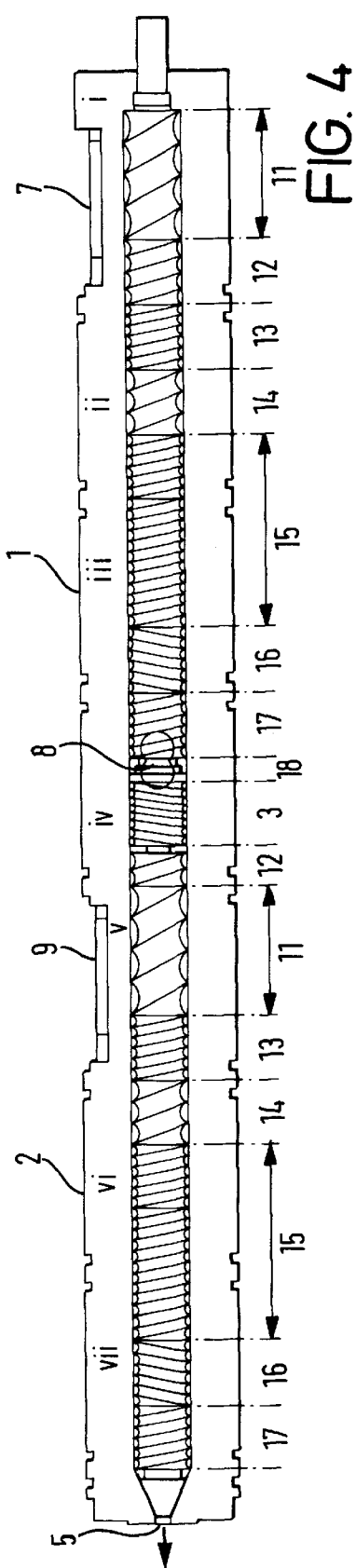
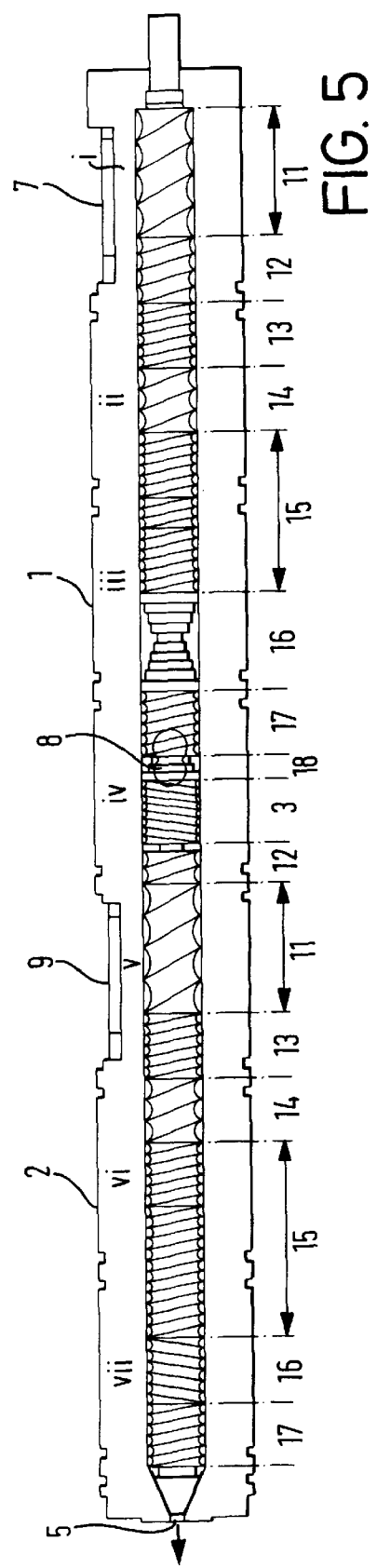

PROCESS FOR THE PREPARATION OF A FOODSTUFF BY EXTRUSION

TECHNICAL FIELD

The subject of the present invention is a process for preparing a foodstuff by extrusion and an installation for carrying out the process.

BACKGROUND ART

EP0169126 (CLEXTRAL) describes a process for preparing a composite foodstuff using an extruder having several successive zones, in which extruder a stream of food substance leaving a first zone comprising a twin-screw unit is split into several independent streams in a second zone comprising two single-screw units, the two independent streams undergoing distinct processing operations, especially distinct colorations, in this second zone and being recombined in a third zone comprising a die to form a single composite product, especially a product containing two differently colored and/or flavored co-extruded parts.

SUMMARY OF THE INVENTION

The object of the present invention is to propose a process and an installation envisaging a particularly effective and/or versatile use of a twin-screw extruder, allowing the preparation of one or more foodstuffs, especially of a composite foodstuff containing several parts with different compositions, textures and/or colors.

To achieve this, in the process according to the present invention, a first food substance to be processed is introduced into a first section of a twin-screw extruder, a second food substance to be processed is introduced into a second section of the twin-screw extruder, this section being separated dynamically from the first, these substances are each processed independently in their own section of the extruder, the two masses obtained are extruded, passing them through at least one die, and the extruded product or products is or are cut.

Likewise, the installation according to the present invention comprises a twin-screw extruder split into two distinct sections by dynamic-separation device, at least one extrusion die and at least one cutting device.

Such a process and such a piece of equipment effectively allow a particularly effective and/or versatile use of a twin-screw extruder, thanks to which use it is possible to prepare one or more foodstuffs, especially a composite foodstuff containing several parts with different compositions, textures and/or colours.

BRIEF DESCRIPTION OF THE DRAWINGS

The device and process of the present invention are more fully understood with reference to the appended drawing figures, wherein:

FIG. 4 is an illustration of the geometry of the screws of the installation of FIG. 1;

FIG. 5 is an illustration of the geometry of the screws of the installation of FIGS. 2 and 3.

DETAILED DESCRIPTION OF THE PREFERRED EMBODIMENTS

Figure 1:
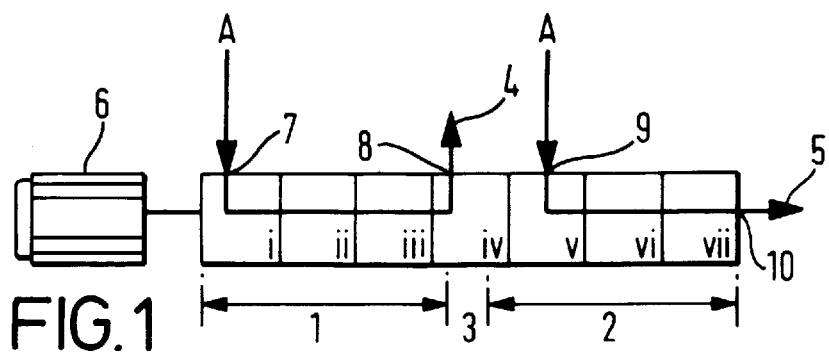
FIG. 1 is a diagram of one embodiment of the invention, where the installation is used to process in similar ways first and second similar food substances.

In this description, the expression "food substance" covers all the components introduced together or separately, at the same time or in succession, into one or other of the two sections of the extruder and processed alltogether at least in part of this section.

In order to carry out the current process, it is possible to start with food substances from which it is possible to produce, by extrusion, the widest possible range of foodstuffs such as breakfast cereals, children's cereals, snacks, crumb coatings, confectionery, pasta or products for domestic animals.

The components and their respective proportions can be chosen, and these substances can then be processed in the extruder under conditions of pressure, shear and temperature which are chosen to suit the characteristics of the product to be obtained, especially as a function of the water content and degree of expansion which is to be obtained after the die.

A first substance and/or a second substance having a water content of 14–22% may be processed in order to obtain an expanded product.

Such a cut expanded product may be dehydrated down to a water content of less than 5%.

A first and/or a second substance having a water content of 24–36% may be processed to obtain a little- or non-expanded product.

The cut little- or non-expanded product may be converted into flakes by rolling and toasting.

Provision may be made to pass at least one of the two substances through a die after it has been subjected to an intermediate processing operation, the latter taking place between an outlet from its section of the extruder and the die, such as prolonged cooking of a substance intended for the production of breakfast cereals with a good cooked taste.

It is possible to start from similar or different first and second food substances and to process each in its own section of the extruder in similar or different ways.

Thus similar first and second substances can be processed in similar ways when there is a desire to increase the productivity of an extruder, the length and power characteristics of which are too high for the type of product it is desired to prepare.

In this case, the two masses of processed substance can be passed through two similar dies or through similar orifices of a common die.

Preferably, the starting point is different first and second substances, and these are processed in different ways in the extruder in order to make it possible, using a single extruder, to prepare novel composite products containing not only two differently colored and/or flavoured parts, but also containing several parts with different compositions, textures and/or colors.

In particular, it is possible to co-extrude a mass of processed substance which expands and a mass of processed substance which does not expand on leaving the die, in order to prepare crunchy expanded snacks filled with a soft filling, or to co-extrude two masses of processed substance which expand on leaving the die, in order to prepare crunchy snacks with two components of different texture, taste and color, for example.

The installation for carrying out the process according to the present invention therefore comprises a twin-screw extruder split into two distinct sections by a dynamic-separation device, at least one die and at least one cutting device.

The dynamic-separation device may be produced in the form of a blocking zone where the twin-screw unit is of opposite hand.

In this embodiment of the dynamic-separation device, provision may be made for one outlet from the first section of the extruder to straddle a compression zone and the blocking zone of the twin-screw unit.

Provision may be made for an outlet from the second section to be along the axis of or to the side of the downstream end of the extruder.

The outlet from each section may be connected by an appropriate duct to a distinct die, to a common die or to distinct elements of one and the same die.

Provision may be made for there to be a feed device for each section, in the form of one or more feed openings provided in a barrel of the twin-screw unit, starting from the upstream end of the extruder for the first section, and starting from a transport zone following the blocking zone of the twin-screw unit for the second section.

It is possible to envisage a screw geometry which, for each section, is adapted to suit the substance to be processed and to the product which is to be obtained. In particular, successive and/or alternating zones for transporting, compacting, compressing, kneading or mixing, for example, may be envisaged. To define these various zones, the pitch of the screws, the space left empty for the substance to be processed, defined especially by the respective diameters of the shafts and of the flights, may be altered, or bilobes of varying shapes may be inserted, for example. It is also possible to act on a subdivision of the barrel of the extruder into several independent compartments, the temperature of which may be adjusted individually by circulating a cooling or heating fluid.

Finally, the mechanical energy needed to process the first and second food substances in the two sections of the extruder and pass them through the die or dies may be supplied by a single means of driving the screws of the twin-screw unit, such as an electric motor.

To pass a food substance through a die, this motor may be assisted or the load on it may be lightened using a positive-displacement pump such as a gear pump connected upstream of the die, for example.

In the embodiment represented in FIG. 1, the present installation comprises a twin-screw extruder split into two distinct sections 1 and 2 by a dynamic-separation device 3, at least one die 4 and 5 and at least one cutting device, which is not represented. Any conventional cutting device can be used, and these are well known to one of ordinary skill in the art.

The twin-screw unit is driven by a motor 6 and is contained in a double-walled barrel subdivided into seven compartments i–vii, in each of which a cooling or heating fluid can be circulated.

In this installation, a first substance A is introduced into the first section 1 through a feed device comprising a feed opening 7 provided in the first compartment i of the barrel. The mass of substance A processed in the first section 1 leaves the extruder through an outlet 8 provided in the compartment iv of the barrel at the location of the dynamic-separation device 3 and connected to the die 4.

A second substance A similar to the first one is introduced into the second section 2 through a feed device comprising a feed opening 9 provided in the fifth compartment v of the barrel, downstream of the dynamic-separation device 3. The mass of substance A processed in the second section 2 leaves the extruder through an outlet 10 provided along the axis of its downstream end and connected to the die 5, which is similar to the die 4.

Figure 2:
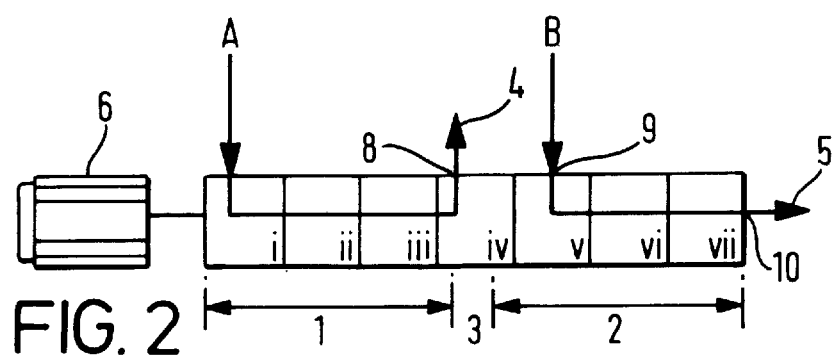
FIG. 2 is a diagram of another embodiment of the invention, where the installation is used to process in different ways first and second different food substances.

In the embodiment represented in FIG. 2, the present installation has differences regarding the geometry of the screws as compared with the embodiment represented in FIG. 1.

In this installation, a first substance A is processed in the first section 1 and a second substance B different from the first, is processed in a different way in the second section 2, the two processed masses being extruded by passing them through respective dies 4 and 5 in order to prepare different products.

Figure 3:
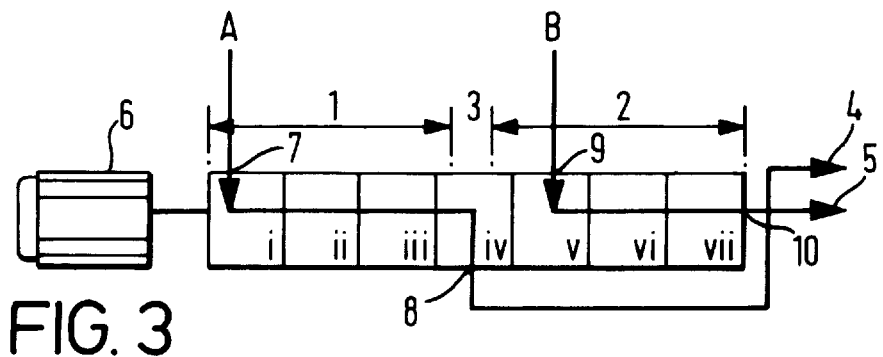
FIG. 3 is a diagram of a third embodiment of the invention, where the installation is used to prepare coextruded first and second food substances.

In the embodiment represented in FIG. 3, the present installation has differences as regards the dies 4 and 5 as compared with the embodiment represented in FIG. 2, the dies this time forming distinct elements of a common co-extrusion die.

In this installation, a first substance A is processed in the first portion 1, a second substance B, which is different from the first, is processed in a different way in the second section 2, and the two processed masses are then co-extruded.

In the embodiment represented in FIG. 4, the geometry of the screws is very similar on both sections 1 and 2 of the extruder.

In section 1, the screws have, in succession, a transport zone 11 (200/100), a compacting zone 12 (100/50), a compression zone 13 (100/33), an intermediate transport zone 14 (100/66), a compression zone 15 (100/35+200/28), a kneading zone 16 (100/–33), a compression zone 17 (100/35), an expulsion zone 18 (three-off 12.5 bilobes), and a blocking zone 3 (100/–25).

In section 2, the screws have, in succession, a compacting zone 12 (50/50), a transport zone 11 (200/100), a compression zone 13 (100/33), a transport zone 14 (100/66), a compression zone 15 (100/35+200/28), a kneading zone 16 (100/–33) and a compression zone 17 (100/–35).

The figures given in brackets give the length of the zone and the pitch in mm, for screws 88 mm in diameter and a distance of 72 mm between axes, the installation in this case comprising a CLEXTRAL BC-72 twin-screw extruder.

The geometry represented is not limited to these dimensions which are given by way of example. It may be transposed onto other models of extruder, especially the models BC-45 (screws 55 mm in diameter, with a distance of 45 mm between axes) or BC-92 (screws 115 mm in diameter, with a distance of 92 mm between axes) in the same series.

The screw flights are preferably double, except for-the reverse flight in the blocking zone which is preferably single.

In contrast to the opposite-handed flight in the kneading zone 16 which on its periphery has cutouts for the passage of the processed mass, the opposite-handed flight in the blocking zone 3 has none in order that it can be as effective as possible in fulfilling its role as a dynamic-separation device.

The outlet 8 from the first section 1 of the extruder has an axial oblong shape, in this case the shape of a figure eight, covering the entire length of the expulsion zone 18, straddling the compression zone 17 and the blocking zone 3.

In the embodiment represented in FIG. 5, the geometry of the screws in the second section 2 of the extruder is similar to that represented in FIG. 4. By contrast, the geometry of the screws in the first section 1 differs from this as regards the compression zone 15 (100/35+50/35+100/28 instead of 100/35+200/28). It also differs from the geometry of FIG. 4 as regards the zone 16 which here is a mixing zone formed of 10 bilobes 15 mm thick, instead of a kneading zone.

Figure 6:
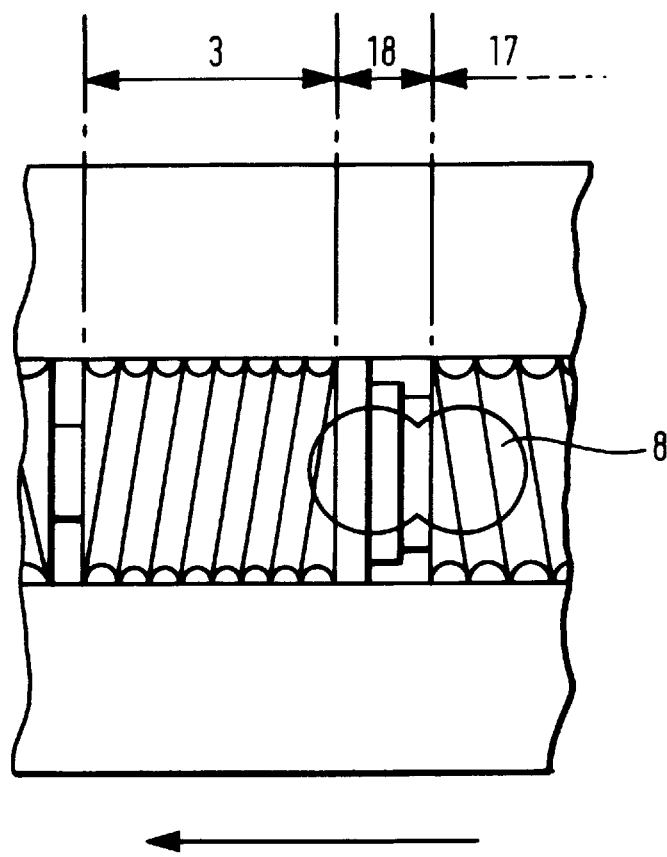
FIG. 6 is an enlarged detailed view of the dynamic separation device of the screws of FIGS. 4 and 5.

FIG. 6 shows in greater detail how the outlet 8 from the first section 1 of the extruder covers the entire length of the expulsion zone 18, straddling the compression zone 17 and the blocking zone 3. In particular it has been observed that it is essential for this opening to overlap the blocking zone 3, by a fraction of the length of the opening which corresponds approximately to 0.1–0.3 times the diameter of the screw, for example, so that the substance taken up by the first flight or flights of the opposite-handed screw can be discharged and expelled effectively.

It is also important, to ensure good dynamic separation, for the blocking zone to be long enough, namely for it to have a length at least equal to the diameter of the screws, for an opposite-handed screw flight of between approximately $1/5$ and $1/3$ of this diameter.

EXAMPLES

The following examples below are given by way of an illustration of the process according to the present invention and of the products which can be obtained thereby. The percentages and parts here are given by weight.

In these examples, the oil may be chosen, if need be, as a function of the physical purpose it has in the processed and extruded mass, and as a function of its taste, neutral or otherwise. It may be chosen from palm kernel oil, groundnut oil or corn oil.

In these examples too, the mixture of flours, the oil and the water are introduced, as appropriate, individually into the feed opening of the extruder section in question.

Example 1

Use is made of an installation like the one represented in FIGS. 1 and 4. The extrusion dies are made in the form of pierced plates each having 6 cylindrical extrusion ducts 3.5 mm in diameter.

This installation is used to prepare one single same breakfast cereal product with the ingredients and under the conditions given in Tables 1a) and 1b) below.

Table 1a) gives the ingredients of a mixture of flours, their proportions in a typical mixture and the possible range of their proportions.

Table 1b) gives the quantities of the ingredients introduced into each section of the installation per hour, the water content of the substance or of the processed mass and the operating conditions.

TABLE 1a

Mixture of flours

| Ingredient | Typical mixture (%) | Possible range (%) |
| --- | --- | --- |
| Cornflour | 20 | 0–80 |
| Wheat flour | 64 | 0–80 |

TABLE 1a-continued

Mixture of flours

| Ingredient | Typical mixture (%) | Possible range (%) |
| --- | --- | --- |
| Oatmeal | 10 | 0–80 |
| Sugar | 4.9 | 2–12 |
| Salt | 1 | 0–3 |
| Vitamins and trace elements | 0.1 | 0.1–0.2 |
| Total | 100 | 100 |

TABLE 1b

Operating conditions

| Parameter | Units | Value | Possible range |
| --- | --- | --- | --- |
| Mixture of flours | kg/h | 300 | 200–350 |
| Palm kernel oil | kg/h | 10 | 0–20 |
| Water | kg/h | 20 | 10–30 |
| Water content of the mass | % | 16.1 | 14–22 |
| Rotational speed of the screws | rpm | 350 | 250–450 |
| Temperature of the mass in the extruder | °C. | 162 | 150–170 |
| Pressure of the product in the extruder | bar | 132 | 80–150 |
| Current | A | 294 | 200–400 |
| Residence time in each section | s | 30 | 20–45 |
| Density of the extruded product | g/l | 115 | 50–160 |

Breakfast cereals in the shape of small balls 8 to 12 mm in diameter are thus obtained.

Example 2

Use is made of an installation like the one represented in FIGS. 2 and 5. The extrusion dies are produced in the form of plates each pierced with 6 cylindrical extrusion ducts 3.5 mm in diameter.

This installation is used to prepare two different breakfast cereal products with the ingredients and under the conditions given in Tables 2a and 2b below.

Table 2a) gives the ingredients of mixtures of flours, their proportions in two typical mixtures, A and B, and the possible range of their proportions.

Table 2b) gives the quantities of ingredients introduced into each section of the installation per hour, the water content of the substances or of the processed masses and the operating conditions.

To process the mass A, the injection of steam into the first section in the region of the intermediate transport zone 14 is provided.

TABLE 2a

Mixtures of flours

| Ingredient | Mixture A (%) | Mixture B (%) | Range mix. A (%) | Range mix. B (%) |
| --- | --- | --- | --- | --- |
| Cornflour | 91 | 20 | 85–98 | 0–80 |
| Wheat flour | — | 64 | — | 0–80 |
| Oatmeal | — | 10 | — | 0–80 |
| Sugar | 6.9 | 4.9 | 0–12 | 0–12 |

TABLE 2a-continued

Mixtures of flours

| Ingredient | Mixture A (%) | Mixture B (%) | Range mix. A (%) | Range mix. B (%) |
|---|---|---|---|---|
| Salt | 2 | 1 | 0–3 | 0–3 |
| Vitamins and trace elements | 0.1 | 0.1 | 0.1–0.2 | 0.1–0.2 |
| Total | 100 | 100 | 100 | 100 |

TABLE 2b

Operating conditions

| Parameter | Units | Value | Possible range |
|---|---|---|---|
| Mixture of flours A | kg/h | 200 | 150–300 |
| Steam | kg/h | 15 | 0–25 |
| Water | kg/h | 35 | 0–60 |
| Water content A | % | 28.8 | 24–36 |
| Mixture of flours B | kg/h | 180 | 150–300 |
| Oil | kg/h | 13 | 0–25 |
| Water | kg/h | 14 | 0–25 |
| Water content B | % | 16.3 | 14–23 |
| Rotational speed of screws | rpm | 250 | 200–450 |
| Temperature mass A | °C. | 125 | 100–140 |
| Pressure mass A | bar | 26 | 20–100 |
| Temperature mass B | °C. | 170 | 140–180 |
| Pressure mass B | bar | 132 | 80–150 |
| Current | A | 184 | 150–400 |
| Residence time | s | 30 | 20–45 |
| Density (B) | g/l | 103 | 60–160 |

Two different breakfast cereal products in the form of expanded small balls 8–12 mm in diameter are thus obtained.

Example 3

Use is made of an installation like the one represented in FIGS. 3 and 5. The co-extrusion die includes two sets of a combination of an annular extrusion opening A with an inside diameter of 8 mm and an outside diameter of 12 mm surrounding a circular extrusion opening B 6 mm in diameter.

This installation is used to prepare a coextruded composite cereal product with the ingredients and under the conditions given in Tables 3a) and 3b) below.

Table 3a) gives the ingredients of mixtures of flours, their proportions in two typical mixtures A and B, and the possible ranges of their proportions.

Table 3b) gives the quantities of ingredients introduced into each section of the installation per hour, the water content of the substances or of the processed masses and the operating conditions.

TABLE 3a

Mixture of flours

| Ingredient | Mixture A (%) | Mixture B (%) | Range mix. A (%) | Range mix. B (%) |
|---|---|---|---|---|
| Cornflour | 64 | 20 | 0–80 | 0–80 |
| Wheat flour | 20 | 64 | 0–80 | 0–80 |
| Oatmeal | 10 | 10 | 0–80 | 0–80 |
| Sugar | 4.9 | 4.9 | 0–12 | 0–12 |

TABLE 3a-continued

Mixture of flours

| Ingredient | Mixture A (%) | Mixture B (%) | Range mix. A (%) | Range mix. B (%) |
|---|---|---|---|---|
| Salt | 1 | 1 | 0–3 | 0–3 |
| Vitamins and trace elements | 0.1 | 0.1 | 0.1–0.2 | 0.1–0.2 |
| Total | 100 | 100 | 100 | 100 |

TABLE 3b

Operating conditions

| Parameter | Units | Value | Possible range |
|---|---|---|---|
| Mixture of flours A | kg/h | 120 | 120–240 |
| Oil | kg/h | 11 | 10–20 |
| Water | kg/h | 21 | 10–40 |
| Water content A | % | 22.5 | 14–23 |
| Mixture of flours B | kg/h | 230 | 200–300 |
| Oil | kg/h | 8 | 8–16 |
| Water | kg/h | 16 | 10–40 |
| Water content B | % | 16.3 | 14–23 |
| Rotational speed of screws | rpm | 340 | 200–450 |
| Temperature mass | °C. | 154 | 140–180 |
| Pressure mass | bar | 81 | 80–150 |
| Current | A | 197 | 150–300 |
| Residence time | s | 30 | 25–45 |
| Density | g/l | 104 | 60–160 |

Co-extruded breakfast cereals with a shape similar to the planet Saturn surrounded by its ring are thus obtained, the contrast between the sphere and the ring being enhanced by a difference in shade and texture, the diameter of the spherical centre being 12–16 mm, the inner edge of the ring being attached to an equator of the sphere, and the outside diameter of the ring being 18–24 mm.

What is claimed is:

1. A process for the preparation of a foodstuff by extrusion, which comprises introducing a first food substance to be processed into a first section of a twin-screw extruder, introducing a second food substance to be processed into a second section of the twin-screw extruder, wherein the second section is separated from the first section to allow separate processing in each section of the extruder to obtain two separate masses at least one of which is extruded through a die to form an extruded foodstuff product.

2. The process according to claim 1, in which the second food substance has a water content of 14 to 22% and is processed to obtain an expanded product.

3. The process according to claim 2, which further comprises cutting the extruded, expanded product, and dehydrating the cut expanded product to a water content of less than 5%.

4. The process according to claim 1, in which the second food substance has a water content of 24–36% and is processed to obtain a little- or non-expanded product.

5. The process according to claim 4, in which the little- or non-expanded product is cut and converted into flakes by rolling and toasting.

6. The process according to claim 1, in which the first and second food substances are similar and are each processed in their respective section in similar ways before being passed through two separate but similar dies.

7. The process according to claim 1, in which the first food substance and the second food substance are different and are each processed in their respective section in different ways.

8. The process according to claim 1, in which the two masses of processed food substances are mixed and passed through a common die to provide a co-extruded product.

9. The process according to claim 1, in which each of the two masses of processed food substances is passed through different orifices of a common die.

10. The process according to claim 4, in which the two masses of processed food substances are co-extruded.

11. A process for the preparation of a foodstuff by extrusion, which comprises introducing a first food substance to be processed into a first section of a twin-screw extruder, introducing a second food substance to be processed into a second section of the twin-screw extruder, wherein the first and second sections are separated by a dynamic reaction device to allow separate processing in each section of the extruder to obtain two separate masses at least one of which is extruded through a die to form an extruded foodstuff.

12. The process according to claim 11, in which the dynamic-separation device comprises a blocking zone where the twin-screw extruder is of opposite hand such that the blocking zone is created as the twin-screw extruder is operated.

13. The process according to claim 12, further comprises providing a compression zone in the first section and positioning the first section outlet to straddle the compression zone and the blocking zone.

14. The process according to claim 11, which further comprises configuring the first and second sections to each include two compression zones separated by a transport zone to assist in the processing of the food substance or substances.

15. The process according to claim 14, wherein the first and second sections each include a compacting zone prior to the two compression zones, and the first section includes a mixing or kneading zone and a third compression zone following the two compression zones to assist in processing of the foodstuff.

16. The process according to claim 15, which further comprises positioning each zone along a pair of common longitudinal screws, the first section including an outlet having an axial oblong shape to allow the first food substance to exit the first section, and the second section including an inlet having an axial oblong shape to receive the second food substance, and providing the dynamic separation device with a length that is at least as long as the diameter of the screw.

17. The process according to claim 16, which further comprises separately extruding the first and second food substances.

18. The process according to claim 16, in which the first and second food substances are mixed after they pass through the respective first and second sections, and in which the mixed food substances are co-extruded to form a co-extruded product.

19. The process according to claim 16, wherein each screw has a diameter of between 55 and 115 mm and the screws are separated by a distance of between 45 and 92 mm.

20. The process according to claim 11, further comprising cutting the extruded foodstuff before processing it into a final product.

* * * * *